(12) United States Patent
Marking

(10) Patent No.: US 6,311,962 B1
(45) Date of Patent: Nov. 6, 2001

(54) SHOCK ABSORBER WITH EXTERNAL AIR CYLINDER SPRING

(75) Inventor: John Marking, El Cajon, CA (US)

(73) Assignee: Fox Factory, Inc., Watsonville, CA (US)

(*) Notice: Subject to any disclaimer, the term of this patent is extended or adjusted under 35 U.S.C. 154(b) by 0 days.

(21) Appl. No.: 09/201,632

(22) Filed: Nov. 30, 1998

Related U.S. Application Data

(60) Provisional application No. 60/073,478, filed on Feb. 3, 1998.

(51) Int. Cl.$^7$ ........................................... F16F 9/22
(52) U.S. Cl. ..................... 267/64.25; 267/64.26; 188/322.17
(58) Field of Search ............................... 267/64.11, 64.15, 267/64.25, 64.26, 64.28, 291, 293; 188/322.17, 322.22, 322.12, 322.19, 322.16

(56) References Cited

U.S. PATENT DOCUMENTS

| | | | |
|---|---|---|---|
| D. 391,530 | 3/1998 | Turner . | |
| 2,004,380 | * 6/1935 | Nickelsen | 267/64.26 |
| 2,522,323 | * 9/1950 | Whisler, Jr. | 188/388.12 |
| 3,188,072 | * 6/1965 | Wustenhagen et al. | 267/64.25 |
| 3,677,561 | * 7/1972 | McNally | 267/64.16 |
| 3,817,566 | * 6/1974 | Keijzer et al. | 267/64.11 |
| 4,881,750 | * 11/1989 | Hartmann | 267/64.26 |
| 4,971,344 | 11/1990 | Turner . | |
| 5,186,481 | 2/1993 | Turner . | |
| 5,308,099 | * 5/1994 | Browning | 267/64.15 |
| 5,456,480 | 10/1995 | Turner et al. . | |
| 5,580,075 | 12/1996 | Turner et al. . | |
| 5,682,966 | 11/1997 | Cabrerizo-Pariente . | |
| 5,725,226 | * 3/1998 | Cabrerizo-Pariente | 267/64.26 |
| 5,984,060 | * 11/1999 | Clark et al. | 188/322.17 |

OTHER PUBLICATIONS

1999 Sid XC, SL and XL Owner's Manual, Rock Shox, pp. 1–21.

* cited by examiner

*Primary Examiner*—Robert J. Oberleitner
*Assistant Examiner*—Thomas J. Williams
(74) *Attorney, Agent, or Firm*—James F. Hann; Haynes, Beffel & Wolfeld LLP

(57) ABSTRACT

A gas spring shock absorber (10) includes a damping fluid cylinder (14) telescopically housed within a gas cylinder (12). A shaft (16) connects a sealed, outer end (18) of the gas cylinder (12) with a vented piston (32) movably mounted within damping fluid cylinder (14). Shaft (16) passes through a sealed inner end (28) of damping fluid cylinder (14) so that a sliding seal (34) located between gas cylinder (12) and damping fluid cylinder (14) creates a sealed variable-volume gas cylinder (40) between the cylinders.

14 Claims, 2 Drawing Sheets

SHOCK ABSORBER WITH EXTERNAL AIR CYLINDER SPRING

CROSS-REFERENCE TO RELATED APPLICATIONS

This application claims the benefit of and is a continuation-in-part of U.S. Provisional Patent Application No. 60/073,478 filed Feb. 3, 1998, the disclosure of which is incorporated by reference.

BACKGROUND OF THE INVENTION

The present invention relates to shock absorbers.

Conventional automotive vehicles typically have separate suspension springs and separate simple shock absorbers. Simple shock absorbers, which provide damping only, are typically oil-filled cylinders within which a vented piston is mounted. The piston is connected to a shaft which extends out of one end of the cylinder. The outer end of the shaft is mounted to one point on the vehicle; the other end of the cylinder is mounted to another point on the vehicle so that the shock is parallel to the action of the suspension spring.

Another type of shock absorber, which is the type commonly used with motorcycles, off-road vehicles, competition automotive vehicles and off-road bicycles, combines at least part of the suspension function and the shock absorbing function in one unit. This second type of shock absorber commonly uses a spring unit to provide all or part of the suspension function coupled with a damping unit to provide the damping function. Conventional shock absorber designs commonly incorporate an external coil spring, an internal air spring, or an internal bladder to provide the suspension function.

SUMMARY OF THE INVENTION

The present invention provides a shock absorber system which is much lighter than conventional external metal coil spring designs and is much simpler and compact than air bladder designs.

The present shock absorber includes an external air cylinder spring unit and a damping fluid cylinder unit coupled together by a shaft, with the damping fluid cylinder unit being telescopically received within the air cylinder spring unit. A movement damping element, preferably a vented piston, is movably mounted within the damping fluid cylinder. The damping cylinder unit also includes a movable seal, preferably a floating piston, separating a damping fluid on one side from a gas on the other.

As the shock absorber extends and contracts, the movement of the shaft causes the vented piston to move back and forth within the damping fluid cylinder, thus damping the extension and contraction of the shock absorber. As the shaft moves back and forth, however, the volume of the shaft received within the damping cylinder changes. This change in the volume of the shaft received within the damping fluid cylinder is accommodated by the movement of the floating piston, wherein a gas chamber on one side of the floating piston alternately expands and contracts in response to the movement of the shaft.

A dynamic or sliding seal between the inner surface of the air cylinder unit and the outer surface of the damping fluid cylinder unit creates a sealed air chamber, acting as an external air cylinder spring. As only one large diameter seal is used to seal the air chamber, this greatly reduces friction from that present in existing systems. An additional advantage of the present design is that the spring rate can be adjusted by changing the air pressure in the air cylinder unit without affecting the performance of the damper unit.

The present invention finds particular utility for use with on- and off-road vehicles. However, the invention can also be used for other shock-absorbing tasks, such as instrument mounting structures and transportation vibration isolators.

Other features and advantages of the present invention will appear from the following description in which the preferred embodiments have been set forth in detail in conjunction with the accompanying drawings.

DESCRIPTION OF THE SPECIFIC EMBODIMENTS

Figure 1:
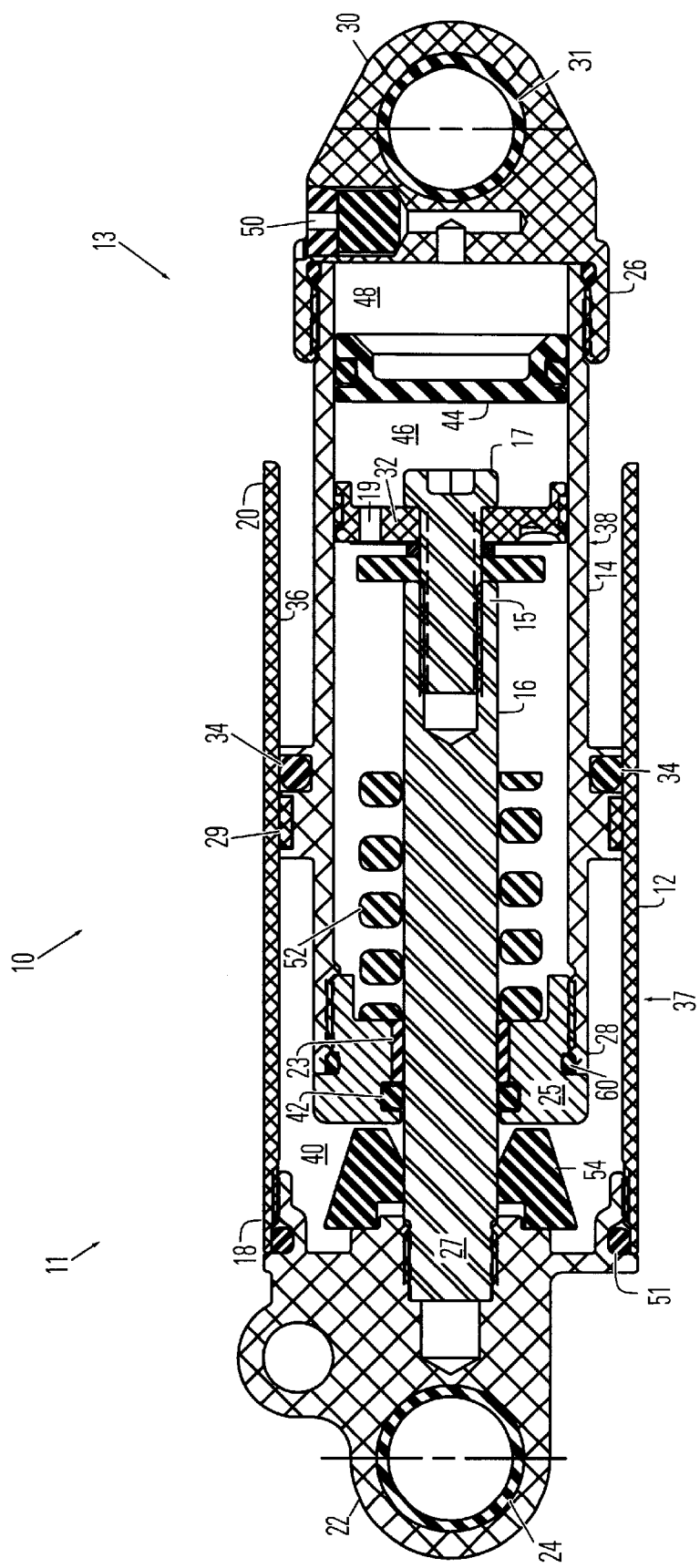
FIG. 1 is a sectional side elevation view of the shock absorber system of the present invention in a fully collapsed or compressed state.
Figure 2:
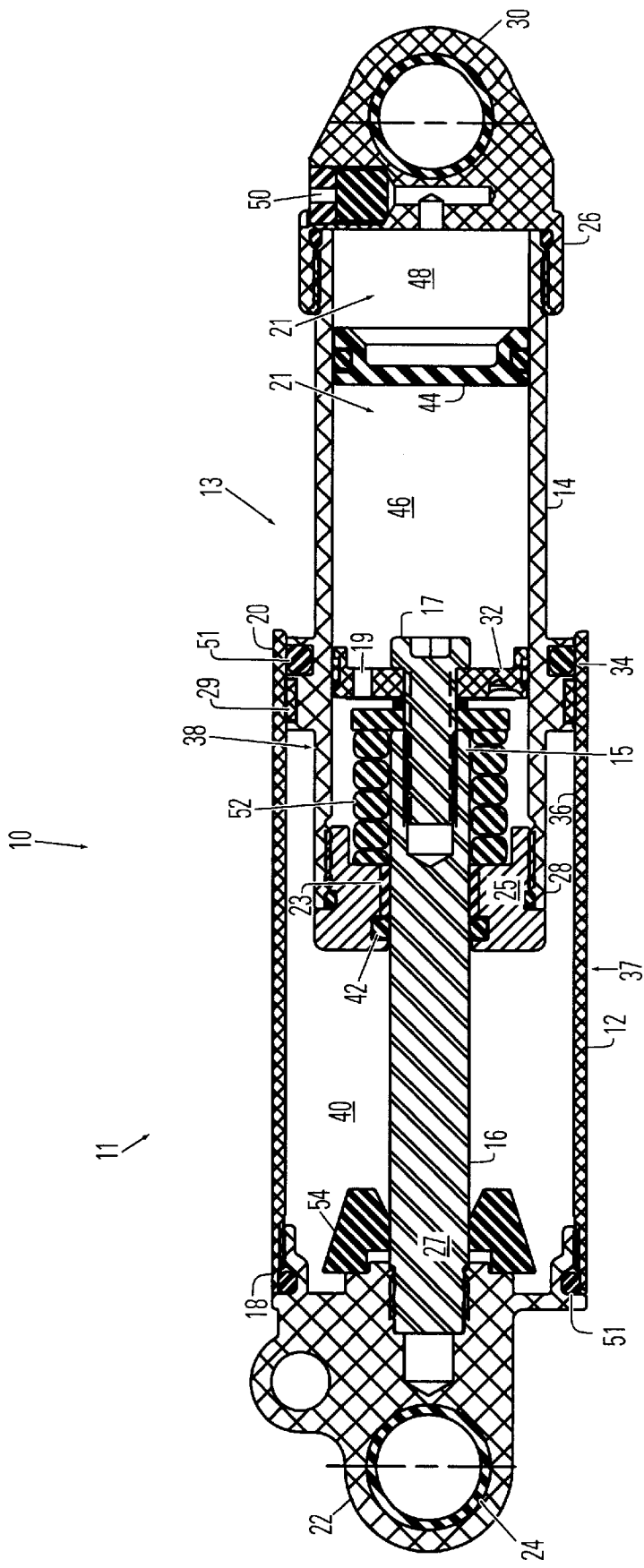
FIG. 2 is a sectional side elevation view of the shock absorber system of the present invention in a fully extended state.

As is shown in FIGS. 1 and 2, the present invention provides a shock absorber 10 comprising a gas cylinder unit 11 and a damping unit 13, with the damping unit 13 being telescopically housed in gas cylinder unit 11. Gas cylinder unit 11 includes an air cylinder 12, having first and second ends 18 and 20, respectively, and a first mounting element 22 threadably mounted to, and sealing, first end 18. Damping unit 13 includes a damping cylinder 14, having first and second ends, 26 and 28, respectively, and a second mounting element 30 sealing first end 26. Units 11 and 13 are coupled together by a shaft 16, having a first end 27 which is secured to mounting element 22. Shaft 16 passes through a cap 25 threadably mounted to second end 28 of damping cylinder 14; an O-ring 51 is used to provide a fluid seal adjacent to the threads joining cap and end 28 of cylinder 14.

First mounting element 22 includes a bearing 24, by which the shock absorber is secured to an appropriate vehicle element (not shown). Second air cylinder end 20 is open. Second mounting element 30 is attached to and seals off first end 26 of damping cylinder 14. Element 30 is used to mount end 26 of the shock absorber to a second vehicle element (not shown).

A dynamic or sliding seal 34 and a bearing 29 are used between inner surface 36 of air cylinder 12 and outer surface 38 of damping fluid cylinder 14 so as to create a sealed air chamber 40 therebetween. This sealed air chamber 40 acts as an external air cylinder spring. An advantage of the present seal 34 and bearing 29 is that they ride on inner surface 36 of air cylinder 12, which prevents the sealing surface from becoming easily damaged. In addition, as only one large diameter seal 34 is required to completely seal air chamber 40, friction is greatly reduced from that seen in existing systems.

A vented piston 32 is secured to end 15 of shaft 16 by a bolt 17. Piston 32 has a vent bore 19 formed therethrough and is movably mounted within the damping fluid cylinder 14. Shaft 16 connects vented piston 32 to first mounting element 22 so that as shock absorber 10 extends and collapses, shaft 16 causes vented piston 32 to move back and forth within the interior 21 of damping fluid cylinder 14. In alternative embodiments, vented piston 32 can be replaced by other motion damping elements keeping within the scope of the present invention.

Damping cylinder 14 also preferably includes a floating piston 44. Floating piston 44 divides interior 21 of damping cylinder 14 into a damping fluid chamber 46, housing vented piston 32 and a gas chamber 48. Gas chamber 48 is sealable, and is filled with a gas that acts as a spring, resisting compression by piston 44. Fluid chamber 46 is filled with a damping fluid, typically oil, thus damping the extension and collapse of the shock absorber. Shaft 16 passes through a sleeve bearing 23 and a seal 42 captured between cap 25 and shaft 16 at second end 28 of damping cylinder 14. Seals 42, and 60 prevent damping fluid from flowing into air cylinder 12.

As shock absorber 10 extends and collapses, the volume of shaft 16 which is housed within damping fluid chamber 46 of damping cylinder 14 changes. This change in the volume of shaft 16 projecting into damping fluid chamber 46 is accommodated by movement of floating piston 44. Such movement of floating piston 44 increases or decreases the pressure within gas chamber 48. It is to be understood that movable seal structures other than floating pistons to accommodate the change in volume can also be used, such as bellows, diaphragms or bladders. The gas volume within the gas chamber 48 of damping fluid cylinder 14 can have its pressure adjusted, typically by way of a pressurization port 50 which is formed in second mounting element 30.

Air cylinder 12 is preferably threaded to the first mounting element 22 to permit easy servicing. That is, first end 18 of air cylinder 12 can be simply unthreaded from the first mounting element 22 to provide access to seal 34 without the need to access the internal damping components or recharging gas chamber 48. A fluid-tight seal between end 18 and element 22 is aided by the use of an O-ring 51.

As shock absorber 10 expands from its compressed state as shown in FIG. 1 to its naturally expanded state shown in FIG. 2, a spring 52 operates to cushion the impact of vented piston 32 against cap 25 which threadably seals end 28 of damping unit 13. The air cylinder 12 also includes a snubber 54, preferably made of rubber or urethane, which is used to cushion the impact of the dampening cylinder 14 against air cylinder 12 when shock absorber 10 is fully collapsed.

One of the primary advantages of the invention is that it is much lighter than conventional external metal coil spring designs and is much simpler and compact than air bladder designs. That is, using damping cylinder 14 as the piston within air cylinder 12 greatly simplifies the construction and provides additional advantages as well. The volume of air chamber 40 can be adjusted by simply changing the position of dynamic seal 34 along damping fluid cylinder 14. Keeping within the scope of the present invention, dynamic seal 34 could be switched so that it rides against an external surface 37 of damping fluid cylinder 14 rather than the internal surface 36 of air cylinder 12. Moreover, while air chamber 40 is, in this embodiment, filled with air, it could be filled with some other gas and could include a pressurization port (not shown) similar to that used at second mounting element 30.

The suspension function of shock absorber 10 is provided by both air chamber 40 in air cylinder 12 and by gas chamber 48 in damping cylinder 14. If the gas chamber 48 is vented to atmosphere, the entire suspension function would be provided by the external air cylinder spring of air chamber 40. Accordingly, a further advantage of the present invention is that changing the pressure within gas chamber 48 does not affect damping but merely affects the preload, which is determined by a combination of any preload provided by the external air chamber 40 and any preload provided by the gas chamber 48. In a preferred embodiment, gas chamber 48 is pressurized with nitrogen. An advantage of using nitrogen over air is that nitrogen is cleaner and is less sensitive to temperature changes.

The present invention has several advantages over designs using conventional metal coil springs. The present invention is lighter in weight. The present air chamber 40 and/or gas chamber 48 can be pressurized with different amounts of gas to change the initial spring resistance, known as sag, preload, or droop. Doing so does change the spring rate. In contrast, with a conventional coil spring shock absorber, the spring would have to be replaced to change the spring rate. Another advantage of air springs over coil springs is that air springs will not take a set (ie: change its unloaded length after use) as coil springs can.

Conventional air spring shock absorbers have an inherent amount of friction that increases the force required to get the shaft to slide in either the compression or rebound directions. This is often referred to as break-away or stiction. The present invention reduces the amount of break-away or stiction because it uses only one large diameter seal in comparison to the three that are normally used. The negative spring force created by air chamber 40 when shock absorber 10 is in, for example, its fully extended condition of FIG. 2 also aids in the reduction of break away friction because it helps collapse the shock absorber.

The present invention provides numerous advantages over internal bladder air spring designs. The present invention is also much simpler in construction than those using an internal bladder, which have a tendency to be more complicated and require more maintenance. Because there is no need for a bladder in the present system, there is no need to service the bladder, which is often difficult. Also, bladder volume is limited because of space requirements needed to accommodate the bladder internally; the maximum volume of air chamber 40 of the present invention is not so limited. Moreover, the bladder material must be accommodated within the shock absorber while the shock absorber is cycling through the compression and rebound strokes without pinching the bladder. This creates additional design restrictions. Over-pressurization of bladders can be dangerous in that they can explode if over-pressurized. Moreover, if bladders are not depressurized before disassembling, they will commonly explode.

Another advantage of the invention relates to the preferred use of threads to mount elements 18, 22, 28 to air and damping cylinders 12, 14. This aids in manufacture (cylinders 12, 14 are uncomplicated), assembly and maintenance of the shock absorber.

Accordingly, the present invention provides significant advantages over conventional external springs and internal air bladder designs of shock absorbers.

In use, the present invention can be constructed by providing a gas cylinder 12 and a damping cylinder 14. Mounting element 22 is threadably mounted to end 18 of gas cylinder 12. Snubber 54 and end 27 of shaft 16 are then mounted against and into mounting element 22, respectively. Seal 42 and sleeve bearing 23 are then received into cap 25. Cap 25 is then threadbly mounted to seal end 28 of damping cylinder 14. Spring 52 and vented piston 32 are then positioned in damping cylinder 14 as end 15 of shaft 16 is received through cap 25. End 28 of damping cylinder 14 is then telescopically received into open end 20 of air cylinder 12 with seal 34 and bearing 29 operating to provide a sealed air chamber 40. Bolt 17 is then tightened such that vented piston 32 is secured to shaft 16. A damping fluid is then received into damping cylinder 14 and a floating piston 44 is then received into damping cylinder 14, separating damping fluid chamber 46 from gas chamber 48. Mounting element 30 is then threadbly received over end 26 of damping cylinder 14, sealing gas chamber 48. The pressurization of gas chamber 48 can then be adjusted by way of pressurization port 50. Lastly, mounting elements 22 and 30 are then attached to different vehicle elements, to provide motion damping therebetween.

During operation, mounting ends 22 and 30 will be displaced toward one another. This displacement motion will be resisted by the movement of damping cylinder 14 into air cylinder 12 increasing the pressure in air chamber 40. This displacement motion will also be resisted by the movement of vented piston 32 (carried by shaft 16) through damping fluid chamber 46 in damping cylinder 14. The displacement of shaft 16 into damping fluid chamber 46 will be accommodated by movement of floating piston 44, compressing gas chamber 48. Shock absorber 10 will tend to spring back to an extended position due to the pressurization of air chamber 40 and gas chamber 48. Spring 52 then operates to cushion the impact of vented piston 32 as it moves toward cap 25.

Modification and variation can be made to the disclosed embodiments without departing from the subject of the invention as defined in the following claims.

What is claimed is:

1. A gas spring shock absorber comprising:
   a gas cylinder unit comprising:
      a gas cylinder comprising first and second gas cylinder ends, said first gas cylinder end being closed, second gas cylinder end being open; and
      the gas cylinder comprising a first mounting element;
   a damping unit comprising:
      a damping fluid cylinder having first and second damping cylinder ends;
      the damping fluid cylinder comprising a second mounting element;
      a movement damping element movably mounted within the damping fluid cylinder;
      said second end of the damping fluid cylinder telescopically housed within the second gas cylinder end;
   a shaft connecting the movement damping element and the gas cylinder unit;
   a fluid seal between the shaft and the damping fluid cylinder, the fluid seal being mounted to and carried by the damping fluid cylinder;
   a sliding seal secured to the damping fluid cylinder and slidably engageable with the gas cylinder creating a sealed gas chamber within the gas cylinder; and
   a movable seal within said damping fluid cylinder, said movable seal separating said damping fluid cylinder into a fluid chamber and a second gas chamber so to accommodate movement of said shaft into and out of the damping fluid cylinder.

2. The gas spring shock absorber of claim 1, wherein,
   the damping fluid cylinder includes a pressurization port formed in the second mounting element in fluid communication with the second gas chamber.

3. The gas spring shock absorber of claim 1, wherein,
   the movement damping element comprises a vented piston movably mounted within the damping fluid cylinder.

4. The gas spring shock absorber of claim 1, wherein,
   the first end of the gas cylinder is closed by the first mounting element threadably mounted to the first end of the gas cylinder.

5. The gas spring shock absorber of claim 4, wherein,
   the first mounting element comprises a bearing.

6. The gas spring shock absorber of claim 1, wherein the movable seal comprises a floating piston.

7. The gas spring shock absorber of claim 1, wherein,
   the first end of the damping cylinder is closed by the second mounting element threadably mounted to the first end of the damping cylinder.

8. The gas spring shock absorber of claim 7, wherein,
   the second mounting element comprises a bearing.

9. The gas spring shock absorber of claim 1, wherein,
   the second end of the damping cylinder is closed by a cap threadably mounted to the second end of the damping cylinder.

10. The gas spring shock absorber of claim 9, wherein,
    the first end of the gas cylinder is closed by the first mounting element threadably mounted to the first end of the gas cylinder; and
    the first end of the damping cylinder is closed by the second mounting element including a bearing.

11. The gas spring shock absorber of claim 1, wherein,
    said second gas chamber is filled with nitrogen.

12. The gas spring shock absorber of claim 1 wherein the fluid seal is mounted to and is carried by a cap, said cap closing the second end of the damping cylinder.

13. A gas spring shock absorber comprising:
    a gas cylinder unit comprising:
       a gas cylinder comprising first and second gas cylinder ends, said first gas cylinder end being closed, second gas cylinder end being open; and
       the gas cylinder comprising a first mounting element;
    a damping unit comprising:
       a damping fluid cylinder having first and second damping cylinder ends;
       the damping fluid cylinder comprising a second mounting element;
       a movement damping element movably mounted within the damping fluid cylinder;
       said second end of the damping fluid cylinder telescopically housed within the second gas cylinder end;
    a shaft connecting the movement damping element and the gas cylinder unit;
    a fluid seal between the shaft and the damping fluid cylinder;
    a sliding seal secured to the damping fluid cylinder and slidably engageable with the gas cylinder creating a sealed gas chamber within the gas cylinder;
    the sealed gas chamber comprising an annular portion between the gas cylinder and the damping fluid cylinder; and
    a movable seal within said damping fluid cylinder, said movable seal separating said damping fluid cylinder into a fluid chamber and a second gas chamber so to accommodate movement of said shaft into and out of the damping fluid cylinder.

14. A gas spring shock absorber comprising:
    a gas cylinder unit comprising:
       a gas cylinder comprising first and second gas cylinder ends, said first gas cylinder end being closed, said second gas cylinder end being open; and
       the gas cylinder comprising a first mounting element threadably mounted to and closing the first end of the gas cylinder;

a damping unit comprising:
  a damping fluid cylinder having first and second damping cylinder ends;
  the damping fluid cylinder comprising a second mounting element threadably mounted to and closing the first end of the damping fluid cylinder;
  a vented piston movably mounted within the damping fluid cylinder;
  said second end of the damping fluid cylinder telescopically housed within the second gas cylinder end;
  a floating piston slidably movable in said damping fluid cylinder, and said floating piston separating said damping fluid cylinder into a fluid chamber and a second gas chamber; and
  a pressurization port formed in the second mounting element in fluid communication with the second gas chamber; and
  a shaft connecting the vented piston and the gas cylinder unit;
  a fluid seal between the shaft and the damping fluid cylinder;
  a sliding seal secured to the damping fluid cylinder and slidably engageable with the gas cylinder creating a sealed gas chamber within the gas cylinder; and
  the sealed gas chamber comprising an annular portion between the gas cylinder and the damping fluid cylinder.

\* \* \* \* \*